(12) United States Patent
Miller

(10) Patent No.: US 11,466,804 B1
(45) Date of Patent: Oct. 11, 2022

(54) VEHICLE EXHAUST EVACUATION SYSTEM

(71) Applicant: Rossman Enterprises, Inc., Cincinnati, OH (US)

(72) Inventor: Paul E. Miller, Fairfield, OH (US)

(73) Assignee: Rossman Enterprises, Inc., Cincinnati, OH (US)

(*) Notice: Subject to any disclaimer, the term of this patent is extended or adjusted under 35 U.S.C. 154(b) by 0 days.

(21) Appl. No.: 17/391,501

(22) Filed: Aug. 2, 2021

(51) Int. Cl.
*F16L 37/00* (2006.01)
*F01N 13/18* (2010.01)
*F01N 13/08* (2010.01)

(52) U.S. Cl.
CPC .......... *F16L 37/004* (2013.01); *F01N 13/082* (2013.01); *F01N 13/1827* (2013.01); *F01N 13/1816* (2013.01); *F01N 2450/10* (2013.01)

(58) Field of Classification Search
CPC ............................ F16L 37/004; F01N 2450/10
See application file for complete search history.

(56) References Cited

U.S. PATENT DOCUMENTS

| | | | |
|---|---|---|---|
| 5,096,230 A | 3/1992 | Pausch et al. | |
| 5,330,234 A | 7/1994 | Sweeny | |
| 5,466,900 A | 11/1995 | Knapp | |
| 5,609,298 A | 3/1997 | Hyslop | |
| 5,927,759 A | 7/1999 | Hyslop | |
| 8,210,572 B2* | 7/2012 | Davis | F16L 37/004 285/9.1 |
| 9,243,734 B2 | 1/2016 | Aubert et al. | |
| 2008/0184702 A1 | 8/2008 | Schnackenberg et al. | |
| 2008/0296891 A1 | 12/2008 | Hyslop | |
| 2009/0250922 A1 | 10/2009 | Rossman et al. | |
| 2011/0084474 A1* | 4/2011 | Paden | F16L 37/004 285/9.1 |
| 2013/0276923 A1* | 10/2013 | Wolff | F16L 37/32 285/1 |
| 2018/0313482 A1* | 11/2018 | Cuber | F16L 37/004 |

FOREIGN PATENT DOCUMENTS

| | | |
|---|---|---|
| EP | 2488311 A2 | 8/2012 |
| EP | 3808463 A1 | 4/2021 |
| WO | 2021074031 A1 | 4/2021 |

* cited by examiner

*Primary Examiner* — Jonathan R Matthias
(74) *Attorney, Agent, or Firm* — Wood Herron & Evans LLP

(57) ABSTRACT

A vehicle exhaust evacuation system includes an adapter secured to an end of a vehicle tailpipe and a nozzle assembly secured to the end of a flexible hose for carrying vehicle exhaust outside of a building. The nozzle assembly has an aluminum cartridge removably secured in a rubber boot. Magnet assemblies are secured to the aluminum cartridge. Openings in the adapter allow ambient air to flow over the magnet assemblies to lengthen the life of the magnets.

20 Claims, 10 Drawing Sheets

VEHICLE EXHAUST EVACUATION SYSTEM

FIELD OF THE INVENTION

This invention relates generally to vehicle exhaust extractions systems for emergency vehicles, such as a fire truck or ambulance. More particularly, this invention relates to an apparatus for attachment to a tailpipe of an emergency vehicle and the method of using such apparatus.

BACKGROUND OF THE INVENTION

Emergency vehicles, such as fire trucks, create a challenge due to the nature of their use. A fire truck is usually backed into a firehouse garage bay and readied for the next emergency call. When an emergency call comes in, the fire truck must be started by one of the firefighters while he waits for everyone to get properly dressed and board the vehicle in their appropriate locations. During this time interval in which the engine is running, exhaust gases exit the tailpipe of the vehicle. Due to the closed nature of the fire bay, these exhaust gases must be vented outside the building to the atmosphere for health and safety reasons.

There are several known emergency vehicle exhaust extraction systems, many of which include a flexible hose which vents to the atmosphere at one end and at the other end is secured to an apparatus or adapter for securement to the tailpipe of the vehicle.

One known system utilizes magnets to removably secure an apparatus located at the end of the hose to the vehicle tailpipe. In such a system, the firefighters need not manually disconnect the hose assembly from the tailpipe. Rather instead, once the garage door to the fire bay is opened, the fire truck may merely exit the building, and the pulling force of the hose pulls the apparatus off the vehicle tailpipe once the vehicle has sufficiently exited the building. This system is disclosed in U.S. Pat. Nos. 5,609,298 and 5,927,759, which are both fully incorporated by reference herein.

One known vehicle exhaust evacuation system requires alignment pins on the adapter which are received in notches in a nozzle assembly to properly position the magnet assemblies of a nozzle assembly relative to the adapter. In use an operator must align the adapter pins with the notches in the nozzle assembly which takes time. Therefore, there is a need for an adapter which does not have alignment pins.

Another drawback to known vehicle exhaust evacuation systems is that the magnets used to join the adapter to the nozzle assembly may be exposed to heat for lengthy time periods, thereby reducing the useful life or longevity of the magnets. Once the magnets lose their strength, they must be replaced. In some applications, the entire adapter or nozzle assembly may need to be replaced. Therefore, there is a need for a vehicle exhaust evacuation system which increases the useful life or longevity of the magnets used to couple the tailpipe adapter to the nozzle assembly.

In other known vehicle exhaust evacuation systems, access to the magnets or check valve may be limited. In such vehicle exhaust evacuation systems, a great deal of time and energy must be used to repair or replace one or more magnets. Therefore, there is a need for a vehicle exhaust evacuation system which provides easy access to the magnets used to couple the tailpipe adapter to the nozzle assembly.

It is therefore one objective of the present invention to provide a more secure connection between the adapter secured to a vehicle tailpipe and a nozzle assembly secured to the end of a flexible hose.

It is another objective of the present invention to provide a nozzle assembly which allows easy access to the magnets and check valve for repair or replacement.

It is another objective of the present invention to provide a nozzle assembly with magnet assemblies which are cooled during operation of the vehicle exhaust evacuation system, thereby increasing the useful life of the magnet assemblies.

SUMMARY OF THE INVENTION

The apparatus of this invention which accomplishes these objectives and one aspect of this invention comprises a vehicle exhaust evacuation system for transporting exhaust gases from a vehicle tailpipe to a location outside a building in which the vehicle is located. The vehicle exhaust evacuation system comprises: 1) an adapter for securement to a vehicle tailpipe and 2) a nozzle assembly for securement to a flexible hose through which the exhaust gases travel. The adapter and nozzle assembly are secured together via the use of magnet assemblies.

The adapter comprises a generally cylindrical fitting adapted to surround the vehicle tailpipe. The adapter further comprises a contact plate secured to the generally cylindrical fitting and extending radially outwardly from the generally cylindrical fitting. The contact plate of the adapter is typically welded to the generally cylindrical fitting but may be secured in another manner. The contact plate of the adapter has openings therethrough which allow ambient air to pass through such openings to cool magnet assemblies of the nozzle assembly. The adapter may further comprise an adapter trim ring welded to an outer surface of the contact plate. The adapter trim ring comprises a tapered portion, a middle portion and a stop portion. The tapered portion increases in diameter as it extends from the contact plate towards the middle portion of the adapter trim ring. The stop portion extends radially outwardly from the middle portion of the adapter trim ring such that the stop portion is generally parallel the contact plate of the adapter. Although the adapter comprises three pieces welded together in the embodiment illustrated, the adapter may be any number of pieces including a single piece.

The nozzle assembly comprises a reducer at a downstream end of the nozzle assembly, a rubber boot at an upstream end of the nozzle assembly and an elbow between the reducer and the rubber boot. The rubber boot is closest to the adapter and has an upstream edge which abuts the stop portion of the adapter. A clamp secures the flexible hose of the vehicle exhaust evacuation system to the reducer.

The nozzle assembly further comprises an aluminum cartridge secured inside a hollow interior of the rubber boot. Fasteners extending through the rubber boot may be used to secure the aluminum cartridge inside the hollow interior of the rubber boot. The aluminum cartridge has a central opening and is annular-shaped. A plurality of cooling passages and a plurality of receptacles extend through the aluminum cartridge. A magnet assembly is secured in each of the receptacles according to one embodiment of aluminum cartridge. In other embodiments of aluminum cartridge, one or more of the receptacles is not filled with a magnet assembly. In most embodiments, at least three magnet assemblies are secured to the aluminum cartridge.

Each magnet assembly comprises two pull pieces and a plurality of disc-shaped magnets between the pull pieces. In one embodiment of magnet assembly, three disc-shaped magnets are secured between the pull pieces. In another embodiment of magnet assembly, two disc-shaped magnets are secured between the pull pieces.

The nozzle assembly further comprises an inner sleeve extending through the central opening of the aluminum cartridge. The inner sleeve is a unitary member having a cylinder-shaped body portion extending through the central opening of the aluminum cartridge and having an upstream edge upstream of the aluminum cartridge. The body portion of the inner sleeve is coaxial with the rubber boot. The inner sleeve also has a flange portion extending radially outwardly from the body portion. The flange portion of the inner sleeve is downstream of the aluminum cartridge. In some embodiments, the inner sleeve of the nozzle assembly may have at least one flange portion which functions to secure the silicone gasket in place. The inner sleeve is preferably made of stainless steel but may be made of any other suitable material.

The nozzle assembly further comprises a silicone gasket or check valve downstream of the aluminum cartridge which is secured to the aluminum cartridge. The inner sleeve of the nozzle assembly extends through a central opening in the silicone gasket. The silicone gasket is sandwiched between the flange portion of the inner sleeve and the aluminum cartridge. The silicone gasket is movable between a closed position and an open position. The silicone gasket is in the closed position when the fan of the vehicle exhaust evacuation system is off, thereby preventing exhaust gases from escaping into the building or station. In its closed position, the silicone gasket covers a downstream surface of the aluminum cartridge thereby preventing exhaust gases from escaping from the cooling passages and receptacles of the aluminum cartridge and passing through the openings of the contact plate of the adapter into the building. When a fan of the vehicle exhaust evacuation system is turned on, the silicone gasket is pulled downstream away from the downstream surface of the aluminum cartridge, thereby allowing ambient air to pass through the cooling passages of the aluminum cartridge and through the receptacles of the aluminum cartridge with magnet assemblies therein to cool the magnet assemblies. The ambient air mixes with the exhaust gases in the exhaust stream downstream of the aluminum cartridge.

The contact plate of the adapter abuts the aluminum cartridge of the nozzle assembly due to the magnet assemblies. The magnet assemblies of the nozzle assembly are drawn or attracted to the contact plate of the adapter.

In other embodiments, magnets may be coupled to the aluminum cartridge, wherein the magnets of the nozzle assembly attract the contact plate of the adapter to the aluminum cartridge between the body portion of the inner sleeve and the rubber boot of the nozzle assembly.

Various additional features and advantages of the invention will become more apparent to those of ordinary skill in the art upon review of the following detailed description of exemplary embodiments taken in conjunction with the accompanying drawings. The drawings, which are incorporated in and constitute a part of this specification, illustrate one or more exemplary embodiments of the invention and, together with the general description given above and the detailed description given below, serve to explain the exemplary embodiments.

DETAILED DESCRIPTION OF THE INVENTION

Figure 1:
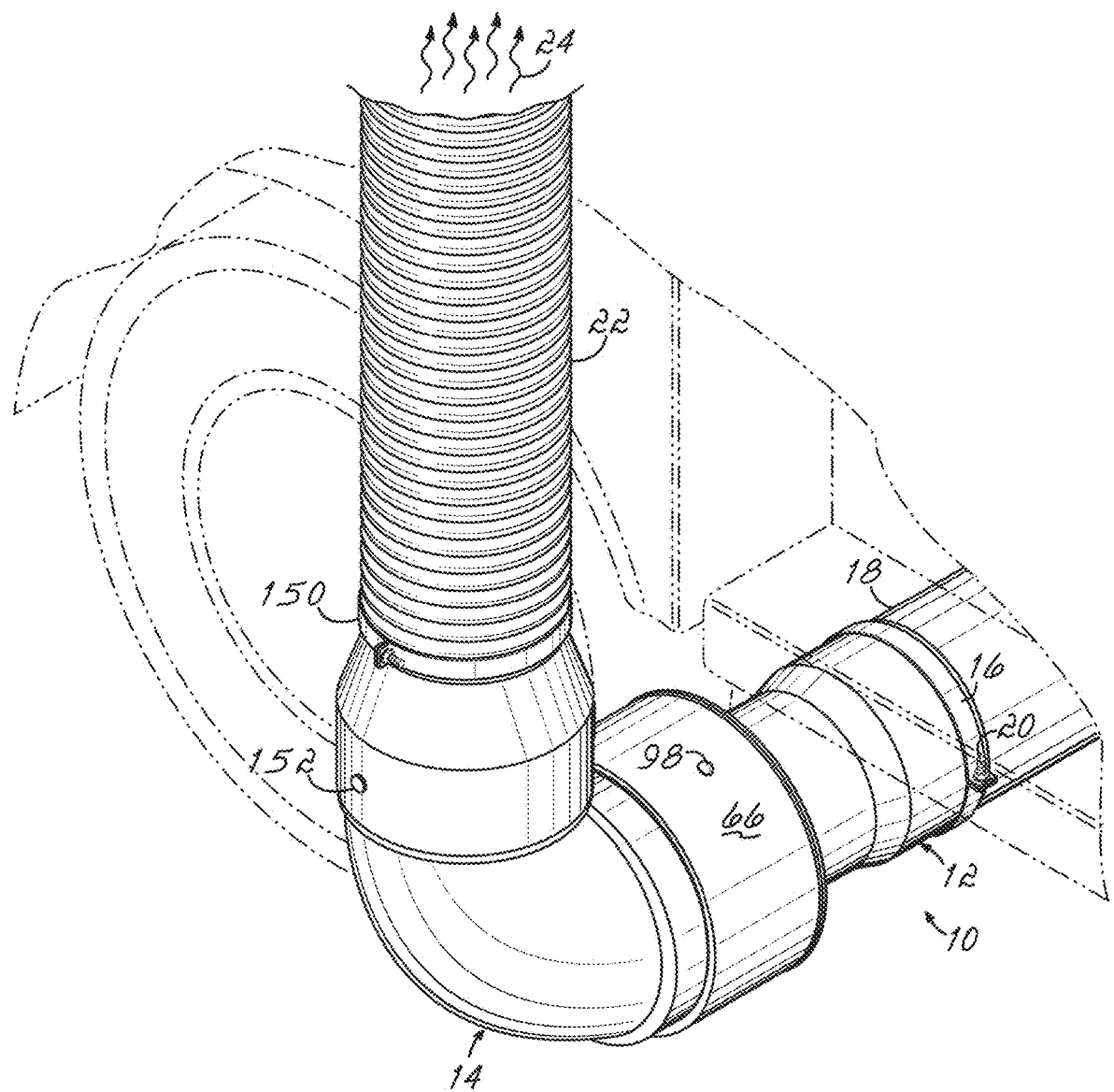
FIG. 1 is a partially diagrammatic perspective view of a portion of a vehicle exhaust evacuation system including a nozzle assembly and an adapter secured to a vehicle tailpipe with portions of the vehicle shown in phantom.
Figure 1A:
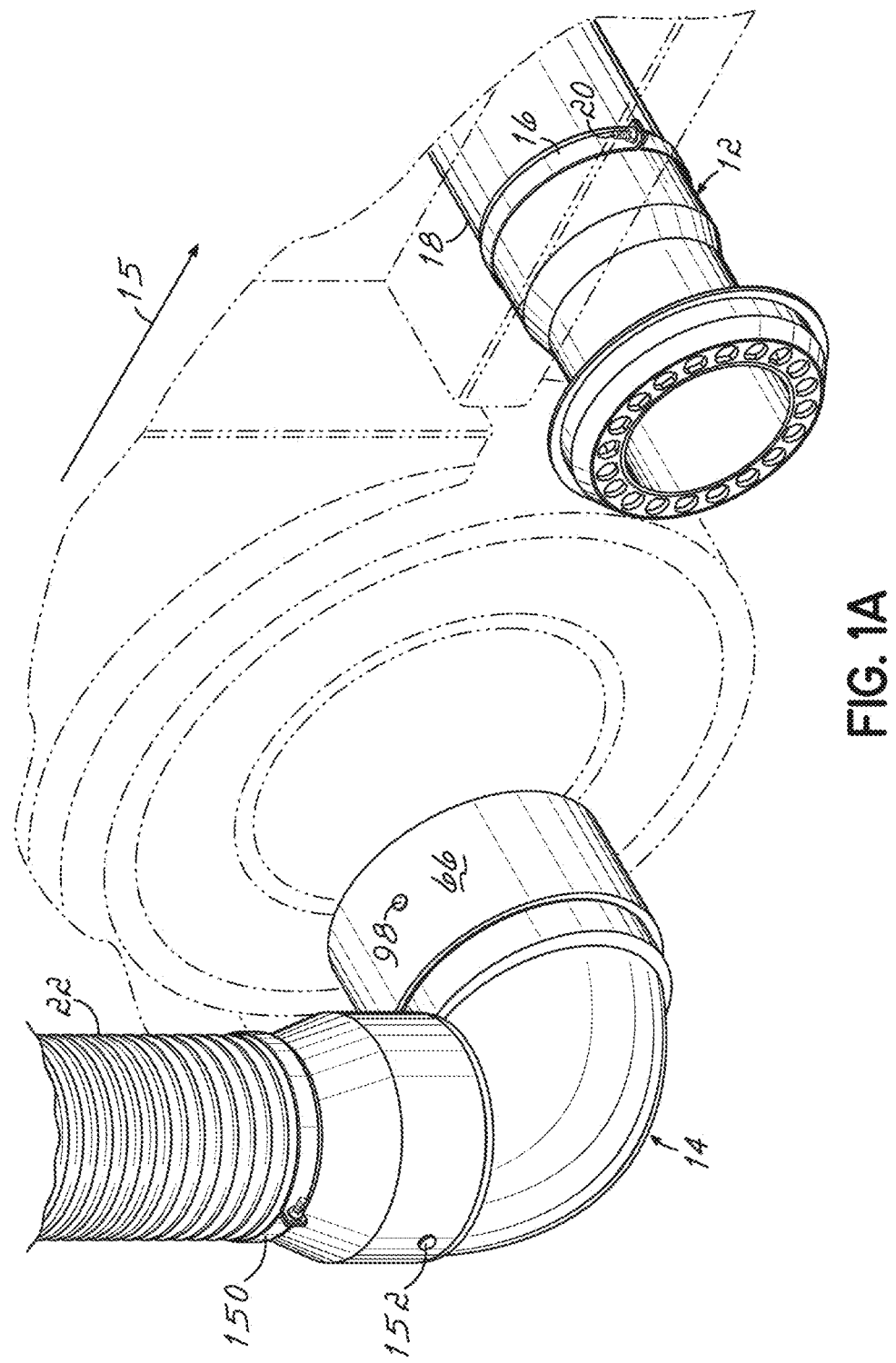
FIG. 1A is a partially diagrammatic perspective view of the portion of a vehicle exhaust evacuation system shown in FIG. 1 showing the vehicle pulled ahead to separate the nozzle assembly from the adapter.

Referring to the drawings, the vehicle exhaust evacuation system 10 of this invention comprises an adapter 12 and a nozzle assembly 14. FIG. 1 shows the adapter 12 and nozzle assembly 14 joined due to magnetic force as described herein, thereby enabling exhaust gases shown by arrows 24 emitted from the vehicle to pass through the adapter 12, then through the nozzle assembly 14 and finally through a flexible exhaust hose 22. The flexible exhaust hose 22 transports gases outside a building such as a firehouse. FIG. 1A shows the vehicle pulled ahead a sufficient distance to create enough force to release the nozzle assembly 14 from the adapter 12.

The adapter 12 is joined to a vehicle tailpipe 18 extending outwardly from a vehicle (shown in phantom in FIGS. 1 and 1A) with a collar 16. The adapter 12 is shown secured to the vehicle tailpipe 18 in FIG. 1 and remains attached to the vehicle tailpipe 18 until one loosens the collar 16 by loosening the fastener 20 which functions to tighten and loosen the collar 16. Although one type of collar 16 is illustrated, any other known mechanism may be used to secure the adapter 12 to the vehicle tailpipe 18.

Figure 4:
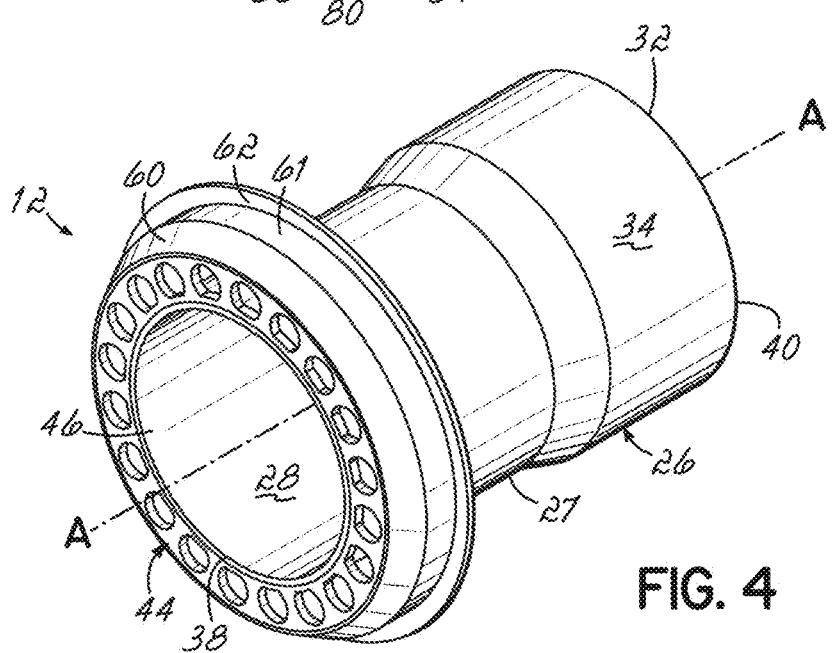
FIG. 4 is a perspective view of the adapter of FIG. 1 fully assembled.

FIG. 1A illustrates the vehicle pulled ahead enough so that a trolley engages an end stop as is known in the art to separate the adapter 12 from the nozzle assembly 14. See arrow 15 of FIG. 1A. The force exerted by the vehicle pulling forward is strong enough to break the magnetic attraction between the magnet assemblies of the nozzle assembly 14 and the contact plate 44 of the adapter 12 as described below. FIGS. 4 and 6 show the details of one embodiment of adapter 12. The adapter 12 comprises a generally cylindrical fitting 26 having a wall 27 defining an interior 28 and being open ended at both ends. This generally cylindrical fitting 26 has an outer edge 30 (furthest away from the vehicle) and an inner edge 32, the linear distance between which defines a length L of the generally cylindrical fitting 26 of the adapter 12. The generally cylindrical fitting 26 has an outer surface 34 and an inner surface 36, the linear distance therebetween which defines the thickness T of the generally cylindrical fitting 26 of the adapter 12. The generally cylindrical fitting 26 of the adapter 12 has an outer circular opening 38 having a first inner diameter and an inner circular opening 40 of a second inner diameter larger than the first inner diameter. See FIG. 5. Both outer and inner circular openings 38, 40, respectively have the same longitudinal central axis "A". See FIG. 6. As shown in FIG. 4, the fully assembled adapter 12 has the same longitudinal central axis "A".

The inner diameter of the inner circular opening 40 of the generally cylindrical fitting 26 of the adapter 12 is sized to fit over the vehicle tailpipe 18. A groove (not shown) may extend inwardly from the outer surface 34 of the generally cylindrical fitting 26 of the adapter 12 to receive the collar 16 to secure the adapter 12 over the vehicle tailpipe 18. Although not shown, any number of slots may be built into the generally cylindrical fitting 26 of the adapter 12 to aid in securing the generally cylindrical fitting 26 of the adapter 12 over the vehicle tailpipe 18.

As best shown in FIG. 6, the adapter 12 further comprises a contact plate 44 welded or otherwise secured to the generally cylindrical fitting 26 of the adapter 12 proximate the upstream or outer edge 30 (furthest away from tailpipe 18). The contact plate 44 is generally annular in shape having an inner surface 42 defining a central opening 46 through which the generally cylindrical fitting 26 of the adapter 12 extends and a circular outer surface 48. Upon assembly, the circular inner surface 42 of contact plate 44 is located against the outer surface 34 of the generally cylindrical fitting 26. As best shown in FIG. 6, contact plate 44 has an upstream or inner face 50 (see FIG. 5) and a downstream or outer face 52 (see FIG. 6). The linear distance between faces 50, 52 defines a thickness T1 of the contact plate 44. The linear distance between the inner and outer surfaces 42, 28 of contact plate 44 defines the width "W" of the contact plate 44. See FIG. 6. Although the drawings shown a certain width "W" of contact plate 44, the drawings are not intended to be limiting. The width of the contact plate may be different than the number illustrated.

Figure 5:
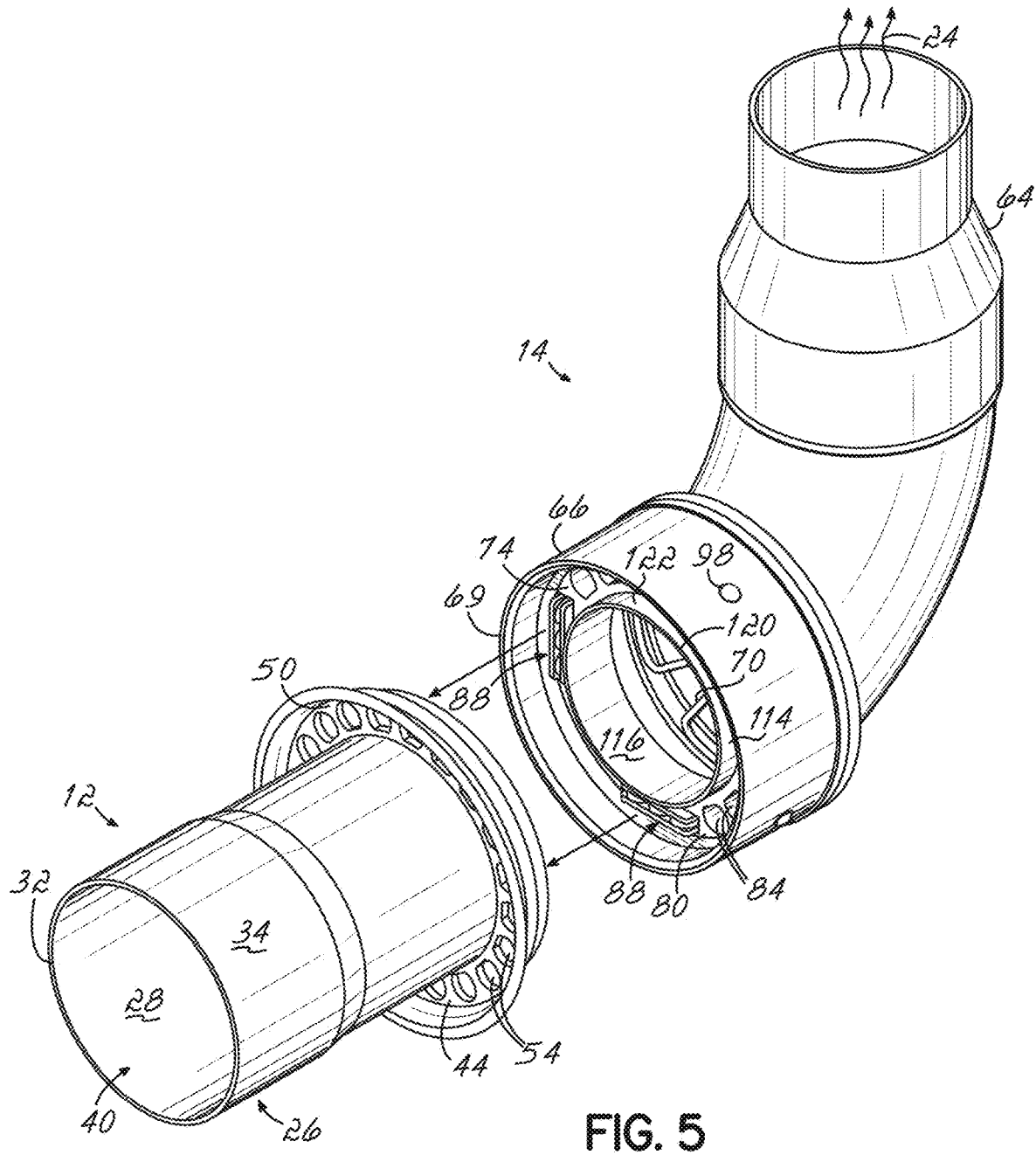
FIG. 5 is a perspective view of the portion of a vehicle exhaust evacuation system shown in FIG. 1 with the nozzle assembly separated from the adapter.
Figure 6:
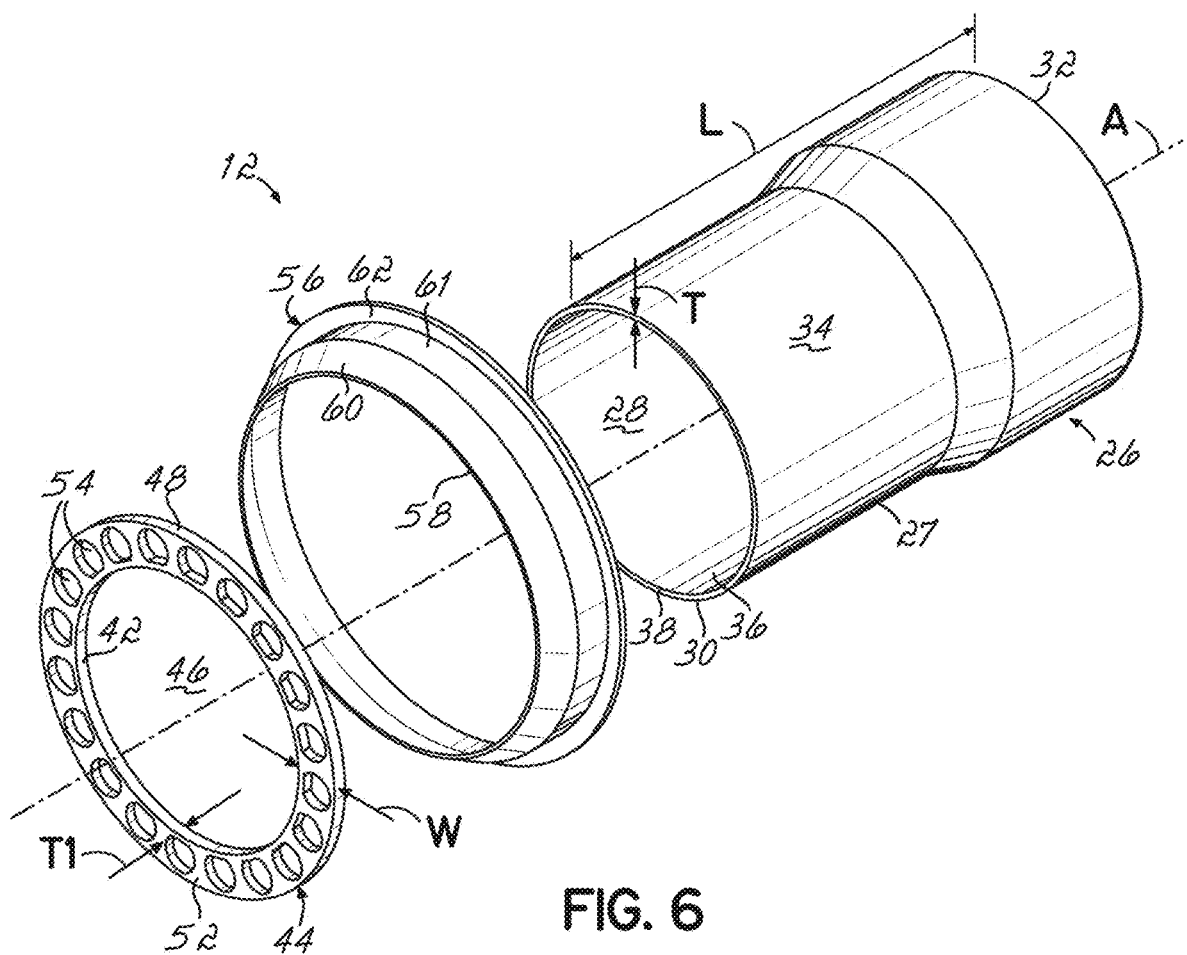
FIG. 6 is a disassembled view of the adapter of FIG. 4.

As best shown in FIGS. 4, 5 and 6, a plurality of openings 54 extend through the thickness T1 of contact plate 44 allowing ambient air to pass therethrough to cool the magnet assemblies described below. Although the drawings shown a certain number of openings 54 of a particular shape, the drawings are not intended to be limiting. The number of openings may be different than the number illustrated. Likewise, the shape of the openings may be different than the shape illustrated.

As best shown in FIG. 6, the third component or piece of the adapter 12 is a trim ring 56 welded to the circular outer surface 48 of the contact plate 44. The trim ring 56 has a circular opening 58 and comprises a tapered portion 60, a middle portion 61 and a stop portion 62 extending radially outwardly from the middle portion 61. Upon assembly, the tapered portion 60 extends upstream from the contact plate 44, increasing in diameter as it extends upstream towards the stop portion 62 of the trim ring 56 of the adapter 12. The middle portion 61 of the trim ring 56 of the adapter has a uniform diameter and an outer surface against which an inner surface 106 of the rubber boot 66 of the nozzle assembly 14 contacts when the adapter 12 is magnetically joined to the nozzle assembly 14. As best shown in FIGS. 8B and 8C, when the nozzle assembly 14 and adapter 12 are secured together with the magnet assemblies, an upstream edge 69 of a rubber boot 66 of the nozzle assembly 14 abuts the stop portion 62 of the trim ring 56 of adapter 12.

Figure 2:
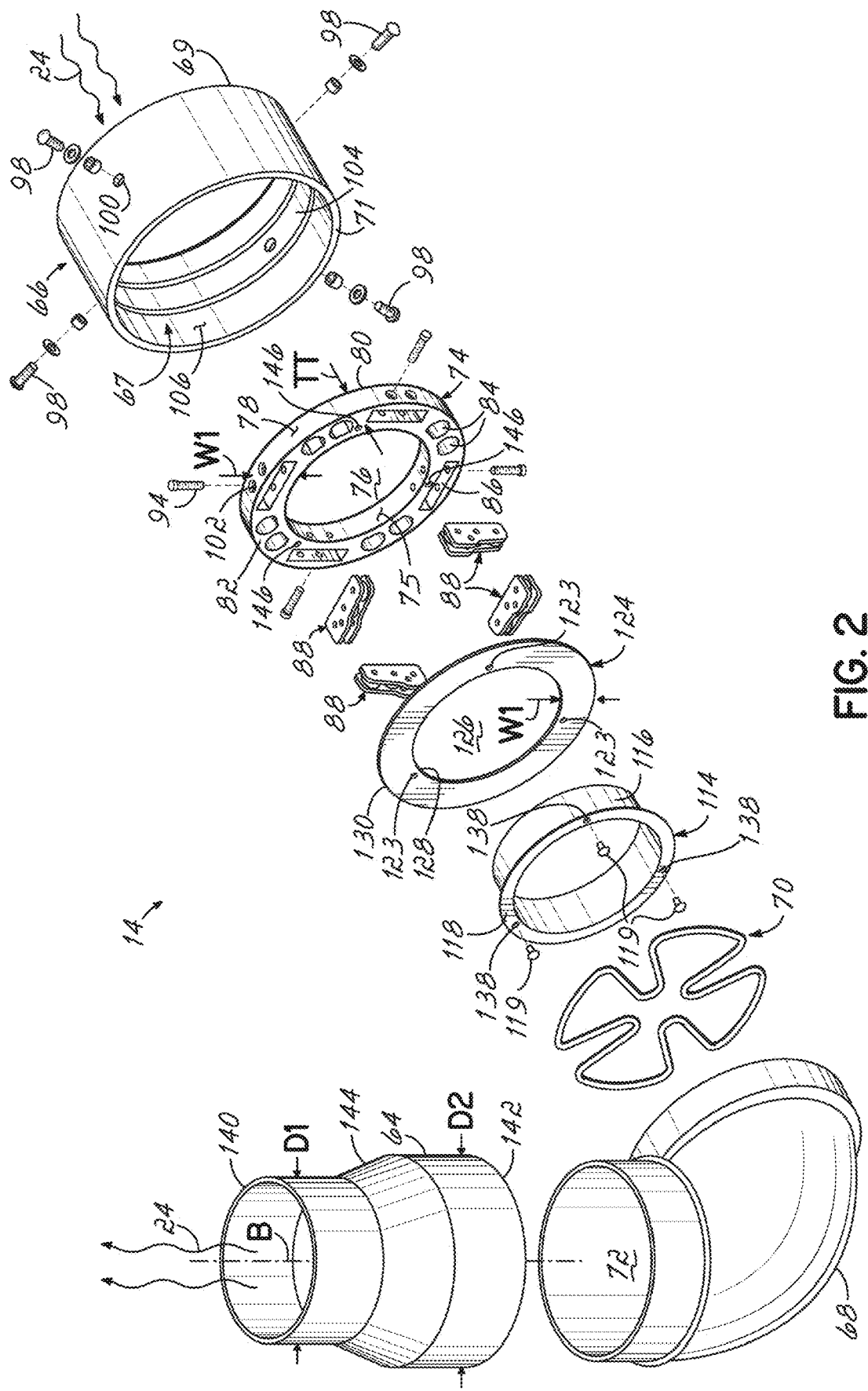
FIG. 2 is disassembled view of the nozzle assembly of FIG. 1.
Figure 3:
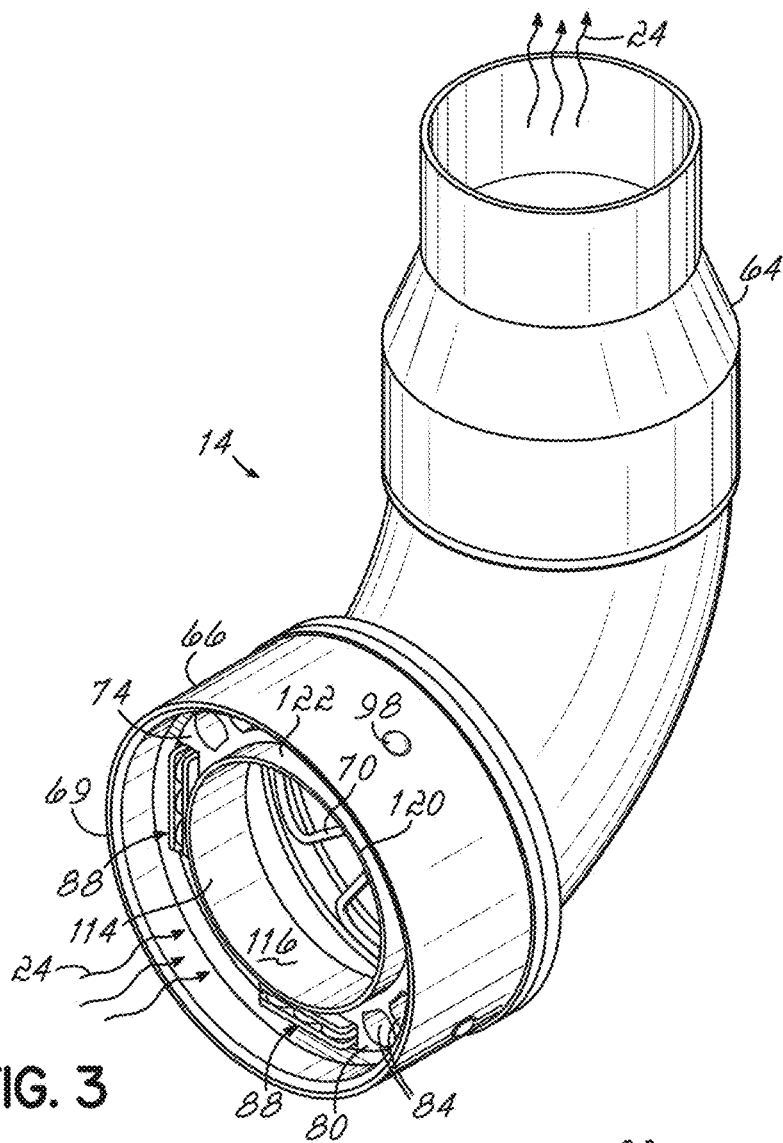
FIG. 3 is a perspective view of the nozzle assembly of FIG. 1 fully assembled.

FIGS. 2 and 3 show the details of one embodiment of nozzle assembly 14. FIG. 2 shows the nozzle assembly 14 in a disassembled condition while FIG. 3 shows the nozzle assembly 14 in an assembled condition. The nozzle assembly 14 comprises a reducer 64 at a downstream end, a generally cylindrical rubber boot 66 at an upstream end and an elbow 68 sandwiched between the reducer 64 and rubber boot 66. A rag screen 70 is located inside a hollow interior 72 of the elbow 68 to keep debris from passing into the flexible hose 22. As best shown in FIG. 2, the rubber boot 66 has a hollow interior 67, an upstream edge 69 and a downstream edge 71. The elbow 68 is preferably made of cast aluminum for purposes of heat dissipation and safety. However, the elbow 68 may be made of any material.

Figure 8A:
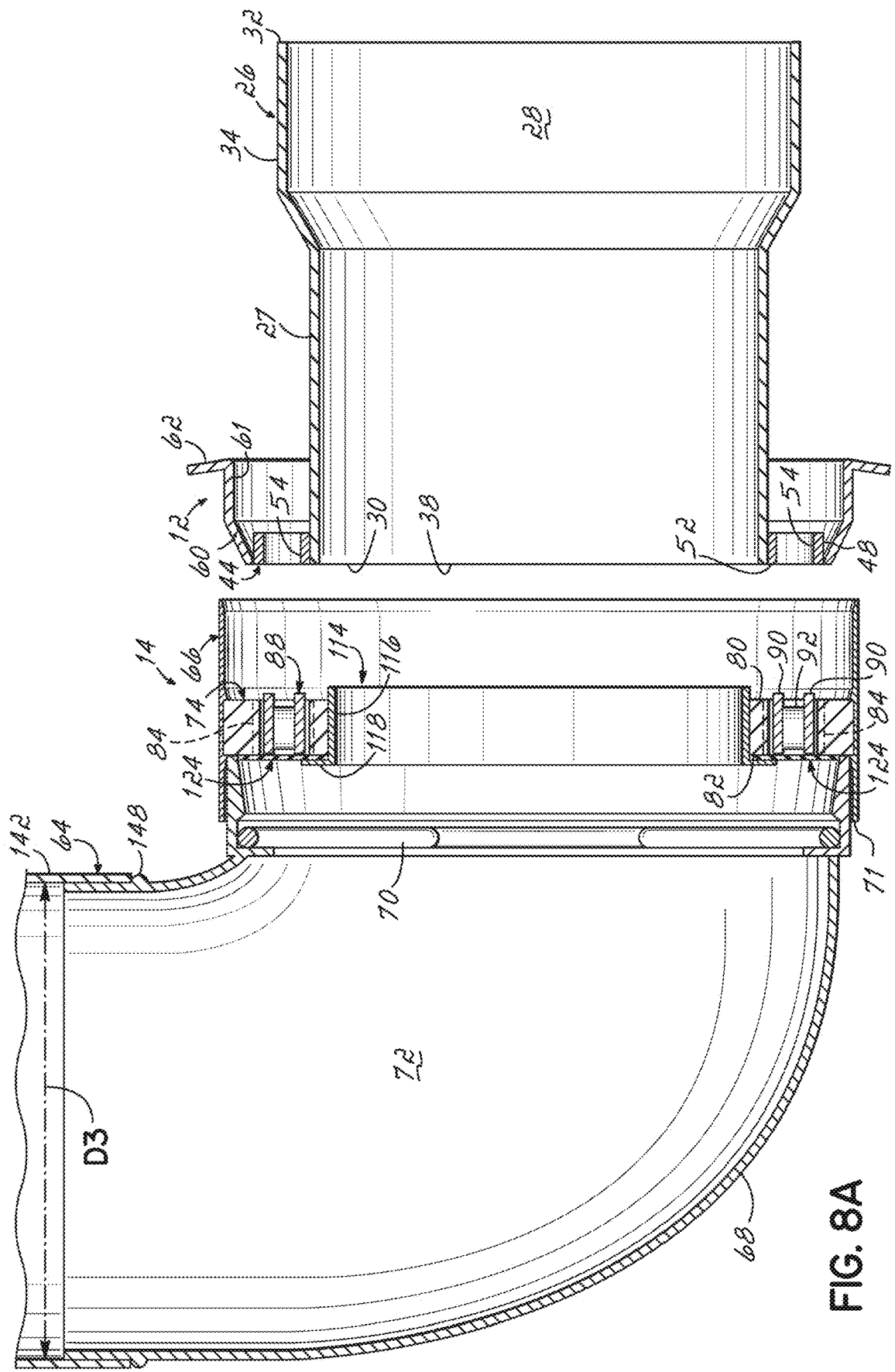
FIG. 8A is an enlarged cross-sectional view of the nozzle assembly separated from the adapter.
Figure 8B:
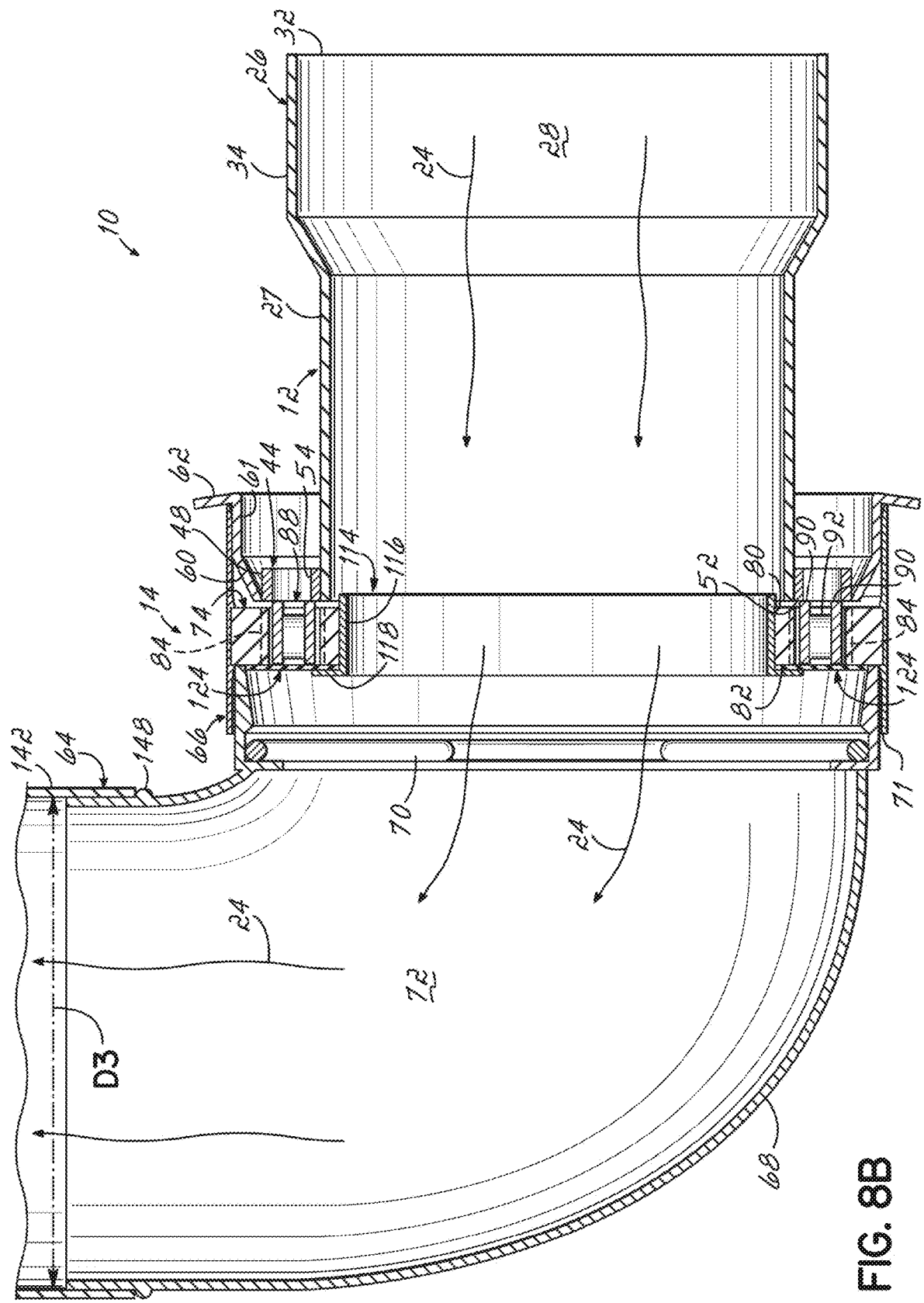
FIG. 8B is an enlarged cross-sectional view of the nozzle assembly joined to the adapter before the fan is turned on showing the silicone gasket in a closed position.
Figure 8C:
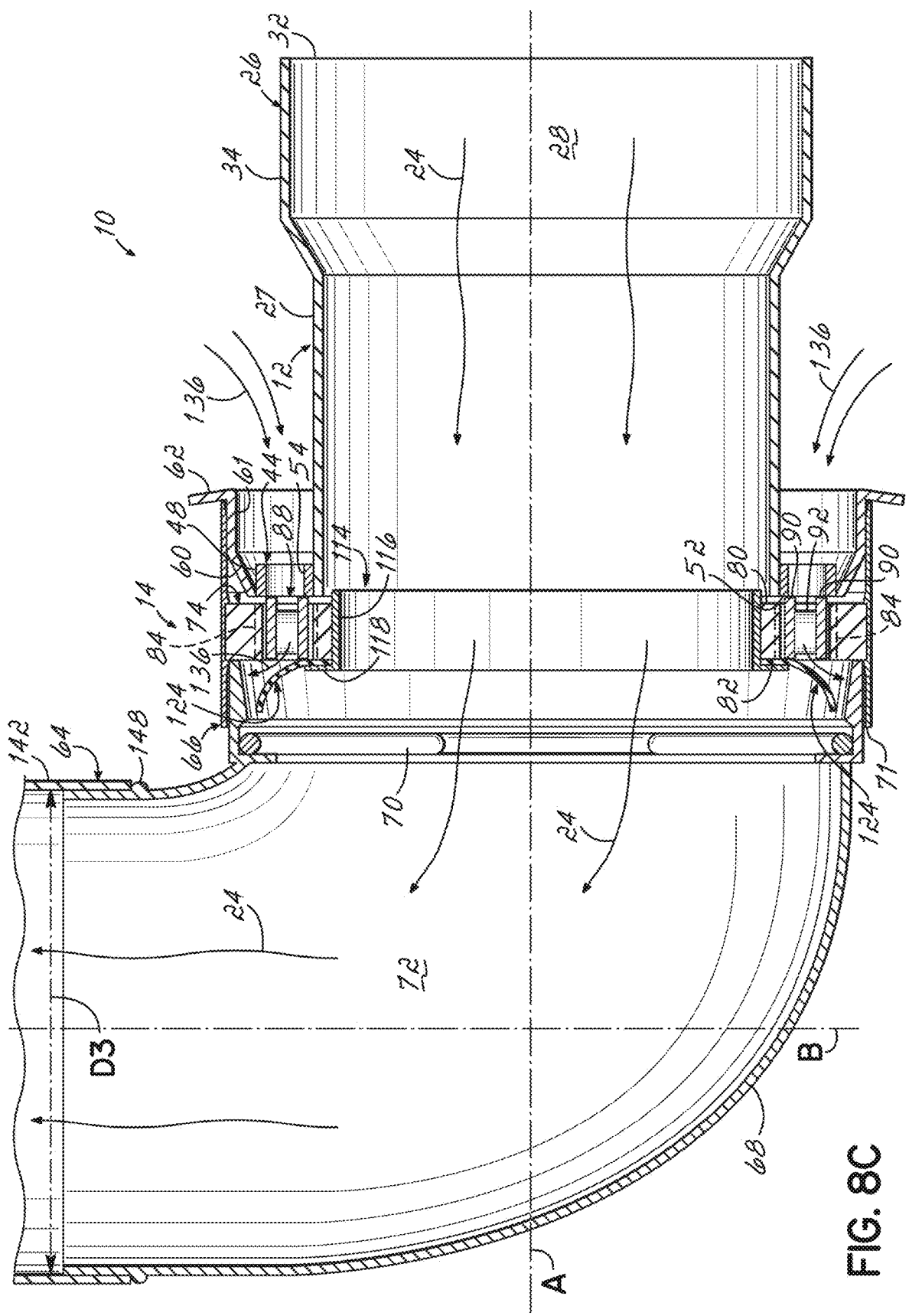
FIG. 8C is an enlarged cross-sectional view of the nozzle assembly joined to the adapter after the fan is turned on showing the silicone gasket in an open position.

As best shown in FIG. 2, the reducer 64 has an upper section 140 having an outer diameter D1, a lower section 142 having an outer diameter D2 and an inner diameter D3 as shown in FIG. 8A-8C. The reducer also has a tapered middle section 144 between the upper and lower sections 140, 142. As best shown in FIGS. 2 and 8C, the reducer 64 also has a central axis "B" which is generally perpendicular to the central axis "A" of the adapter 12 when the nozzle assembly 14 is magnetically joined to the adapter 12. As best shown in FIGS. 1 and 1A, the flexible hose 22 of the vehicle exhaust evacuation system 10 fits over the upper section 140 of the reducer 64 of the nozzle assembly 14 and is held there by a clamp 150.

As best shown in FIG. 8C, the elbow 68 is configured such that when the nozzle assembly 14 is properly coupled to the adapter 12 of a vehicle, the central axis "B" of a vertically oriented or downstream portion of nozzle assembly 14 is generally perpendicular to the central axis "A" of the adapter 12.

As best shown in FIGS. 8A-8C, the elbow 68 has a lip 148 extending outwardly therefrom which acts as a stop to prevent further movement of the lower section 142 of the reducer 64. As shown in FIGS. 8A-8C, the elbow 68 fits inside the inner diameter D3 of the lower section 142 of reducer 64 and is secured thereto by fasteners 152 (see FIGS. 1 and 1A). Although only one fastener 152 is shown in FIGS. 1 and 1A, any number of fasteners 152 may be used to secure the reducer 64 to the elbow 68. The ability of an operator to quickly and easily change the reducer of the nozzle assembly is one of the principal advantages of the present invention. The remainder of the nozzle assembly may remain the same. If the nozzle assembly is to be secured to a flexible hose of a different diameter, only the reducer of the nozzle assembly needs to be changed. The remainder of the nozzle assembly does not need to be changed or modified.

The nozzle assembly 14 further comprises an aluminum cartridge 74 which has an annular shape including an inner surface 75 defining a central opening 76, an outer surface 78, an upstream face 80 and a downstream face 82. The linear distance between the upstream and downstream faces 80, 82 defines a thickness TT of the aluminum cartridge 74. When assembled, the upstream and downstream faces 80, 82 of the aluminum cartridge 74 are generally perpendicular to the direction of flow of the exhaust gases. The exhaust gases 24 flow through the inner sleeve 114 of nozzle assembly 14 and do not contact the aluminum cartridge 74, as explained below. As best shown in FIG. 8C, the aluminum cartridge 74 is radially between the inner sleeve 114 of nozzle assembly 14 and the rubber boot 66.

As best shown in FIG. 2, aluminum cartridge 74 has a plurality of cooling passages 84 and a plurality of receptacles 86 extending through the entire thickness TT of the aluminum cartridge 74. The drawings illustrate the receptacles 86 as being rectangular in shape; however, they may be any desired shape or size. Although the drawings illustrate eight cooling passages 84 and four receptacles 86 arranged in a certain pattern, two cooling passages 84 between each receptacle 86, the drawings are not intended to be limiting. The aluminum cartridge 74 may have any number of cooling passages of any desired shape between any number of receptacles of any desired shape.

The linear distance between the inner and outer surfaces 75, 78 of aluminum cartridge 74 defines the width "W1" of the aluminum cartridge 74. See FIG. 2.

Figures 7A, 7B:
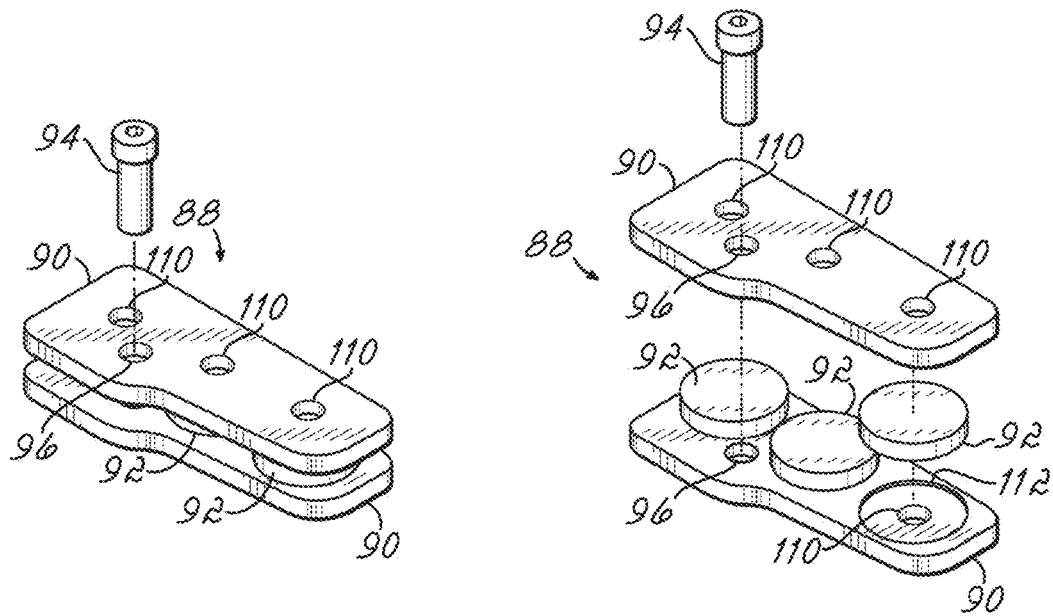
FIG. 7A is a perspective view of one of the magnet assemblies used in the nozzle assembly.
FIG. 7B is a partially disassembled view of the magnet assembly of FIG. 7A.

A magnet assembly 88 is secured in each receptacle 86 via a fastener 94. As best shown in FIGS. 7A and 7B, each magnet assembly 88 comprises two pull pieces 90 and three disc-shaped magnets 92 sandwiched between the pull pieces 90. As best shown in FIG. 2, a fastener 94 is used to pass through the interior of the aluminum cartridge 74 from the outer surface 78 of the aluminum cartridge 74 and through openings 96 in the pull pieces 90. The fastener 94 is shown as a non-threaded fastener but may be any conventional fastener. The drawings are not intended to be limiting. Each fastener 94 is held in openings 96 in pull pieces 90 by the pressure exerted on the fastener 94 by the rubber boot 66 outside thereof.

In order to remove or replace one of the magnet assemblies 88 or any portion thereof, the aluminum cartridge 74 must be removed from inside the rubber boot 66. Fastener 94 must be removed from openings 96 in pull pieces 90 of the magnet assembly 88, thereby allowing removal of the magnet assembly 88 from the receptacle 86 of the aluminum cartridge 74 in which it resides.

As best shown in FIG. 7B, each disc-shaped magnet 92 resides between one recess 112 in one of the pull pieces 90 and another recess 112 in the other pull piece 90 (only one being shown). The recesses 112 in the pull pieces 90 are created by making openings 110 in the pull pieces 90. Each of the pull pieces 90 is movable relative to the other pull piece 90. Each of the recesses 112 is slightly larger in diameter than the diameter of the disc-shaped magnet 92 which resides therein, allowing movement of the disc-shaped magnet 92 relative to the pull pieces 90. This allows for efficient operation of the magnet assembly even if one or more of the pull pieces 90 deforms slightly over time.

As best shown in FIG. 2, the aluminum cartridge 74 is secured inside the hollow interior 67 of rubber boot 66 with fasteners 98 which extend through openings 100 in the rubber boot 66 and into threaded openings 102 in the aluminum cartridge 74. The aluminum cartridge 74 may be supported by a groove 104 extending around an interior surface 106 of the rubber boot 66. Alternatively, a clamp such as a compression clamp may be used to secure the aluminum cartridge 74 inside the hollow interior 67 of the rubber boot 66. The clamp may be located in a groove extending inwardly from an outer surface of the rubber boot 66.

As best shown in FIG. 2, the nozzle assembly 14 further comprises an inner sleeve 114 having a body portion 116 and a flange portion 118 extending radially outward from the body portion 116. The body portion 116 of the inner sleeve 114 has an upstream edge 120. As best shown in FIG. 3, fully assembled, the upstream edge 120 of the inner sleeve 114 is upstream of the aluminum cartridge 74. Upon assembly, an entire upstream portion 122 of the inner sleeve 114 is upstream of the upstream face 82 of the aluminum cartridge 74. The inner sleeve 114 is preferably a unitary member but may be made of multiple pieces.

The inner sleeve 114 of nozzle assembly 14 provides a pathway for the hot exhaust gases 24 so the exhaust gases 24 do not overheat the magnet assemblies 88. The inner sleeve 114 also provides stability to the nozzle assembly 14 once a portion of the body portion 116 of the inner sleeve 114 is located inside the wall 27 of the adapter fitting 16 as shown in FIG. 8B. As shown in FIGS. 8B and 8C, when the nozzle assembly 14 is properly secured to the adapter 12, the body portion 116 of the inner sleeve 114 of nozzle assembly 14 helps keep the magnet assemblies 88 engaged with the outer face 52 of contact plate 44 of adapter 12. Furthermore, the body portion 116 of the inner sleeve 114 of nozzle assembly 14 prevents movement of the nozzle assembly 14 relative to the adapter 12.

Referring to FIG. 2, another component of the nozzle assembly 14 is an annular-shaped check-valve or a silicone gasket 124 having a central opening 126. The silicone gasket 124 is annular-shaped like the aluminum cartridge 74 and has approximately the same width "W1" as does the aluminum cartridge 74. Such width "W1" of the silicone gasket 124 is defined as the linear distance between an inner surface 128 and outer surface 130 of the silicone gasket 124.

Upon assembly, the silicone gasket 124 is sandwiched between the flange portion 118 of the inner sleeve 114 and the downstream face 82 of the aluminum cartridge 74. As shown in FIG. 2, fasteners 119 extend through openings 138 in the flange portion 118 of the inner sleeve 114, through openings 123 in the silicone gasket 124 and into threaded openings 146 in the aluminum cartridge 74. As best shown in FIG. 3, upon assembly, the body portion 116 of inner sleeve 114 extends upstream through the central opening 126 of silicone gasket 124 and through the central opening 76 in the aluminum cartridge 74 such that the upstream portion 122 of the inner sleeve 114 extends upstream beyond the upstream face 80 of the aluminum cartridge 74.

As best shown in FIGS. 3 and 5, the magnet assemblies 88 are located radially outward from the body portion 116 of inner sleeve 114 and radially inward from the rubber boot 66 of the nozzle assembly. Some embodiments of nozzle assembly have three magnet assemblies while other embodiments of nozzle assembly have four magnet assemblies. However, any number of magnet assemblies may be secured to the aluminum cartridge in accordance with the present invention.

As best shown in FIGS. 8B and 8C, the silicone gasket 124 is moveable between a closed position shown in FIG. 8B when the fan is off and an open position shown in FIG. 8C when a fan of the vehicle exhaust evacuation system is on. When the silicone gasket 124 is in its open position, ambient air flows through the cooling passages 84 and receptacles 86 with magnet assemblies 88 secured therein, thereby cooling the aluminum cartridge 84 and magnet assemblies 88. See arrows 136 shown in FIG. 8C. Such cooling prolongs the useful life the magnet assemblies 88 resulting in a superior nozzle assembly than previously known. The magnet assemblies 88 are stronger for longer, thereby resulting in a superior connection between the adapter 12 and nozzle assembly 14 than known connections.

The silicone gasket 124 and associated components in the present arrangement serve two purposes. Upon the vehicle being turned on, the fan still being off, the silicone gasket 124 prevents vehicle exhaust from flowing upstream through the cooling passages 84 of the aluminum cartridge 74 of nozzle assembly 14 and through the openings 54 in the contact plate 44 of the adapter 12 and into the building in which the vehicle is running. Cooling passages 84 of the aluminum cartridge 74 and openings 54 in the adapter 12 are located between the inner sleeve 114 and the rubber boot 66 of the nozzle assembly 14.

The second purpose of the silicone gasket 124 is to allow ambient air to flow through the openings 54 in the contact plate 44 of the adapter 12 and through the cooling passages 84 of the aluminum cartridge 74 of nozzle assembly 14 to cool the aluminum cartridge and magnets and/or magnet assemblies before mixing with the vehicle exhaust in the elbow 68 of the nozzle assembly 14 when the silicone gasket 124 is opened due to fan activation. See FIG. 8C.

Due to the unique design of the nozzle assembly 14, hot exhaust gases pass through the body portion 116 of inner sleeve 114 without passing over the magnet assemblies 88. With the magnet assemblies 88 located outside the body portion 116 of inner sleeve 114, the hot exhaust gases depicted by arrows 24 do not pass over the magnet assemblies 88, thereby increasing the useful life of the magnet assemblies 88 and magnets 92 therein.

Figure 9A:
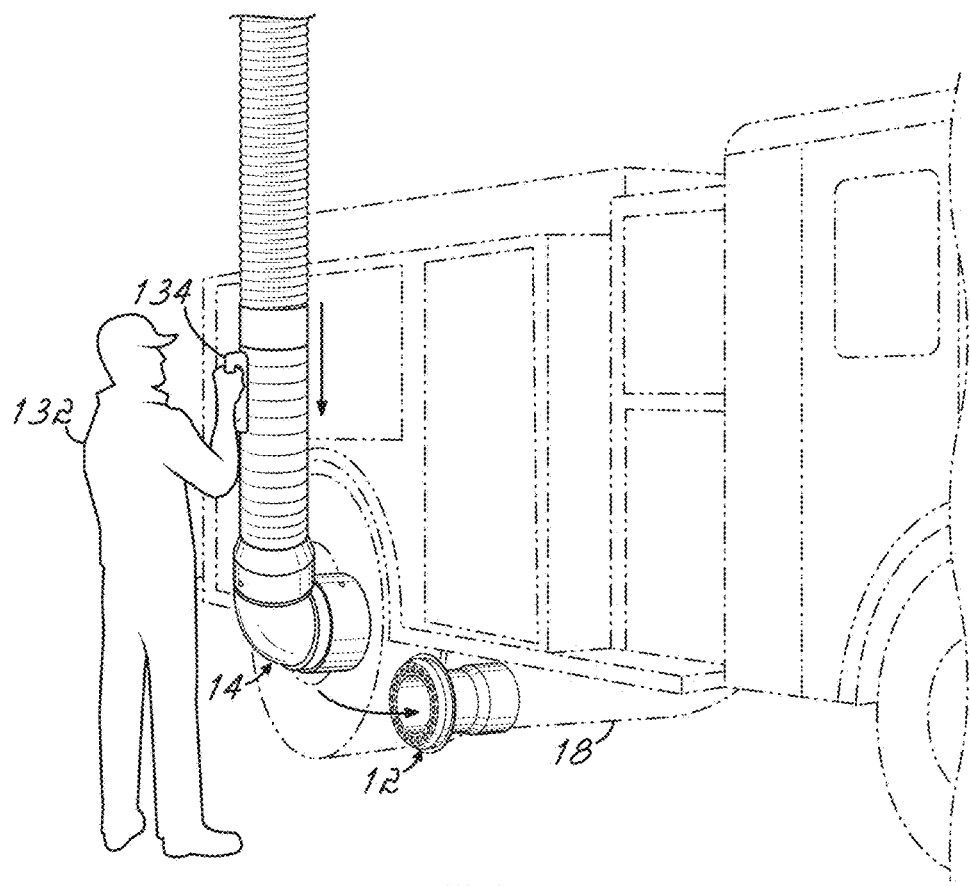
FIG. 9A is a perspective view showing an operator pulling down the flexible hose of the vehicle exhaust evacuation system.
Figure 9B:
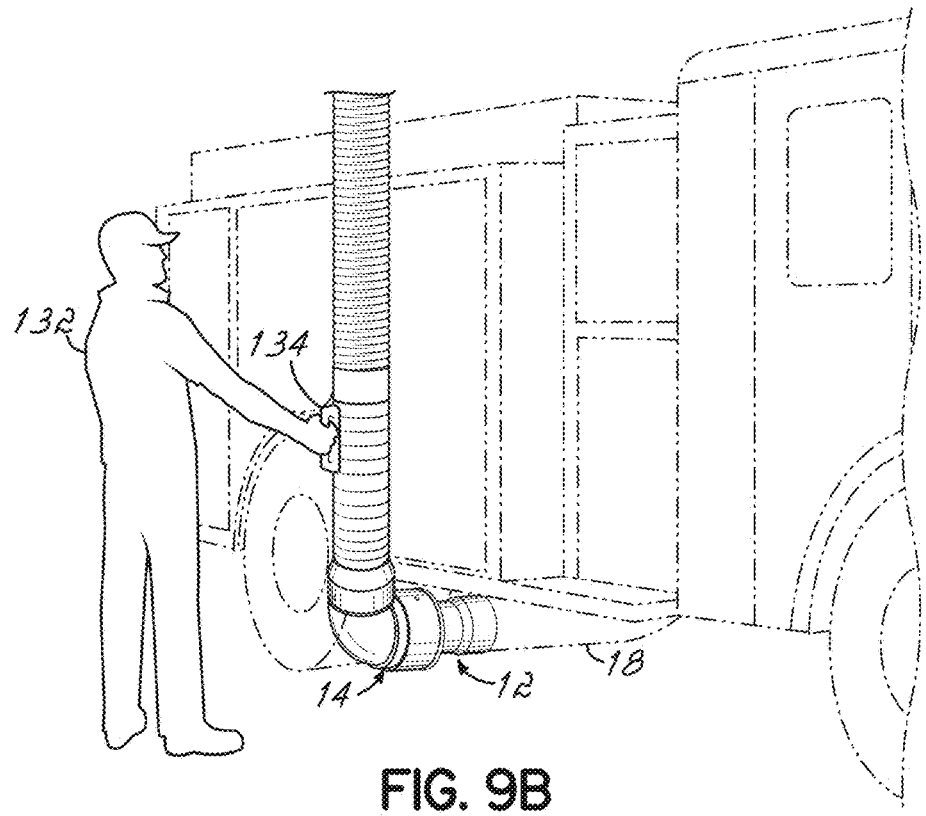
FIG. 9B is a perspective view showing an operator securing the nozzle assembly of the vehicle exhaust evacuation system to the adapter secured to the vehicle tailpipe.

FIG. 9A illustrates an operator 132 pulling downwardly a handle 134 of flexible hose 22 to align the nozzle assembly 14 with the adapter 12 on the end of the vehicle tailpipe 18. Due to the unique configuration of the nozzle assembly 14 and adapter 12 of the present invention, the operator 132 does not have to bend downwardly to pull the nozzle assembly upward for attachment to the adapter.

Due to the unique mating configuration between the nozzle assembly 14 and adapter 12, the nozzle assembly 14 and flexible hose 22, when separated from the adapter 12, are pulled upwardly by a spring balancer/retractor to suspend the nozzle assembly 14 at a higher elevation than the adapter 12. The location of the nozzle assembly 14 above the adapter 12 allows the operator to simply pull downwardly on the handle 134 of the flexible hose 22 to attach the nozzle assembly 14 to the adapter 12.

Due to the integral mating configuration between the nozzle assembly 14 and adapter 12, the operator may attach the nozzle assembly 14 to the adapter 12 from a standing position without bending down to attach the nozzle assembly to the adapter.

While we have described only one embodiment of this invention, persons skilled in this art will appreciate changes and modifications which may be made without departing from the spirit of this invention.

What is claimed is:

1. A vehicle exhaust evacuation system comprising:
an adapter for securement to a vehicle tailpipe and a nozzle assembly for securement to a flexible hose,
said adapter comprising a generally cylindrical fitting adapted to surround the vehicle tailpipe and a contact plate secured to the generally cylindrical fitting and extending radially outwardly from generally cylindrical fitting,
said nozzle assembly having reducer at a downstream end of the nozzle assembly, a rubber boot at an upstream end of the nozzle assembly and an elbow between the reducer and the rubber boot,
an aluminum cartridge secured inside a hollow interior of the rubber boot, said aluminum cartridge having a central opening and cooling passages extending through the aluminum cartridge,
magnet assemblies secured inside receptacles extending through the aluminum cartridge, each of the magnet assemblies comprising two pull pieces and multiple magnets secured between the pull pieces,
an inner sleeve extending through the central opening of the aluminum cartridge, said inner sleeve having a flange portion extending radially outwardly from the body portion of the inner sleeve, the body portion of the inner sleeve extending upstream of the aluminum cartridge and being coaxial with the rubber boot,
a silicone gasket sandwiched between the flange portion of the inner sleeve and the aluminum cartridge, wherein the contact plate of the adapter abuts the aluminum cartridge of the nozzle assembly due to the magnet assemblies.

2. The vehicle exhaust evacuation system of claim 1, further comprising a band clamp adapted to surround the wall of the rubber boot to secure the rubber boot to the elbow.

3. The vehicle exhaust evacuation system of claim 1 wherein said contact plate of the adapter has openings therethrough.

4. The vehicle exhaust evacuation system of claim 1 further comprising a rag screen inside the elbow of the nozzle assembly.

5. The vehicle exhaust evacuation system of claim 1 wherein said generally cylindrical fitting of said adapter has a wall, an upstream circular opening and a downstream circular opening, the contact plate of the adapter being proximate the downstream circular opening of the adapter, said adapter further comprising an adapter trim ring welded to an outer surface of the contact plate and extending from the contact plate towards the upstream circular opening of the adapter, said adapter trim ring having a tapered portion extending upstream from the contact plate and a stop portion extending radially outwardly from the tapered portion of the adapter trim ring, said stop portion being generally parallel the contact plate.

6. The vehicle exhaust evacuation system of claim 5, wherein said stop portion of the adapter trim ring abuts an upstream edge of the rubber boot of the nozzle assembly.

7. The vehicle exhaust evacuation system of claim 1, wherein fasteners extend through the rubber boot of the nozzle assembly to secure the aluminum cartridge inside the hollow interior of the rubber boot.

8. A vehicle exhaust evacuation system comprising:
an adapter for securement to a vehicle tailpipe and a nozzle assembly for securement to a flexible hose,
said adapter comprising a generally cylindrical fitting adapted to surround the vehicle tailpipe and allow exhaust from the vehicle to pass through the adapter and into said nozzle assembly, said adapter having a contact plate to which magnet assemblies of the nozzle assembly are drawn,
said nozzle assembly having a reducer at an upstream end of the nozzle assembly, a rubber boot at a downstream end of the nozzle assembly and an elbow between the reducer and the rubber boot,
a cartridge secured inside a hollow interior of the rubber boot, said cartridge having a central opening,
said magnet assemblies of the nozzle assembly being secured to the cartridge, each of the magnet assemblies comprising two pull pieces and multiple magnets secured between the pull pieces,
an inner sleeve extending through the central opening of the cartridge, said inner sleeve having a body portion and at least one flange portion, the body portion of the inner sleeve extending through the central opening of the cartridge and being coaxial with the rubber boot, a silicone gasket sandwiched between the at least one flange portion of the inner sleeve and the cartridge.

9. The vehicle exhaust evacuation system of claim 8, wherein said rubber boot has an upstream edge which abuts a portion of the adapter.

10. The vehicle exhaust evacuation system of claim 9, wherein said magnet assemblies are located radially outward of the body portion of the inner sleeve of the nozzle assembly and radially inwardly of the rubber boot of the nozzle assembly.

11. The vehicle exhaust evacuation system of claim 10, wherein the nozzle assembly has at least three magnet assemblies.

12. The vehicle exhaust evacuation system of claim 9, wherein said contact plate of said adapter has spaced openings therethrough.

13. The vehicle exhaust evacuation system of claim 12, wherein said silicone gasket of the nozzle assembly covers cooling passages of the cartridge preventing ambient air to pass through the cooling passages of the cartridge unless a fan of the vehicle exhaust evacuation system is turned on.

14. The vehicle exhaust evacuation system of claim 9, wherein fasteners extend through the rubber boot of the nozzle assembly to secure the cartridge inside the hollow interior of the rubber boot.

15. A vehicle exhaust evacuation system comprising:

an adapter for securement to a vehicle tailpipe and a nozzle assembly for securement to a flexible hose, said adapter comprising a generally cylindrical fitting adapted to surround the vehicle tailpipe and allow exhaust from the vehicle to pass through the adapter and into said nozzle assembly, said adapter having a contact plate extending radially outward from the generally cylindrical fitting of the adapter;

said nozzle assembly having a reducer at an upstream end of the nozzle assembly, a rubber boot at a downstream end of the nozzle assembly and an elbow between the reducer and the rubber boot, an aluminum cartridge secured inside a hollow interior of the rubber boot, said aluminum cartridge having a central opening, magnets coupled to the aluminum cartridge, an inner sleeve extending through the central opening of the aluminum cartridge, said inner sleeve having a flange portion extending radially outwardly from a body portion of the inner sleeve, the body portion of the inner sleeve extending upstream of the aluminum cartridge and being coaxial with the rubber boot, a silicone gasket sandwiched between the flange portion of the inner sleeve and the aluminum cartridge, wherein said magnets of said nozzle assembly attract said contact plate of said adapter to said aluminum cartridge between the body portion of the inner sleeve and the rubber boot of the nozzle assembly.

16. The vehicle exhaust evacuation system of claim 15, wherein the silicone gasket has a central opening through which the body portion of the inner sleeve of the nozzle assembly extends.

17. The vehicle exhaust evacuation system of claim 15, wherein the magnets are located in magnet assemblies, each of the magnet assemblies being secured inside a receptacle extending through the aluminum cartridge.

18. The vehicle exhaust evacuation system of claim 17, wherein each of the magnet assemblies has multiple disc-shaped magnets.

19. The vehicle exhaust evacuation system of claim 15, wherein the silicone gasket is movable between a closed position when a fan of the vehicle exhaust evacuation system is off and an open position when the fan is on.

20. The vehicle exhaust evacuation system of claim 19, wherein said contact plate of said adapter has spaced openings therethrough which allow ambient air to cool the magnet assemblies of the nozzle assembly when the silicone gasket is in the open position.

* * * * *

UNITED STATES PATENT AND TRADEMARK OFFICE
CERTIFICATE OF CORRECTION

| | |
|---|---|
| PATENT NO. | : 11,466,804 B1 |
| APPLICATION NO. | : 17/391501 |
| DATED | : October 11, 2022 |
| INVENTOR(S) | : Paul E. Miller |

It is certified that error appears in the above-identified patent and that said Letters Patent is hereby corrected as shown below:

In the Specification

Column 4, Line 5 reads, "FIG. 2 is disassembled view of the..." and should read -- FIG. 2 is a disassembled view of the... --.

Column 5, Lines 43-44 read, "Although the drawings shown a certain..." and should read -- Although the drawings show a certain... --.

Column 5, Lines 50-51 read, "Although the drawings shown a certain..." and should read -- Although the drawings show a certain... --.

Column 8, Line 60 reads, "...cooling prolongs the useful life the magnet assemblies 88..." and should read -- ...cooling prolongs the useful life of the magnet assemblies 88... --.

In the Claims

Claim 1, Column 9, Lines 57-59 read, "...extending radially outwardly from generally cylindrical fitting, said nozzle assembly having reducer..." and should read -- ...extending radially outwardly from the generally cylindrical fitting, said nozzle assembly having a reducer... --.

Signed and Sealed this
Thirteenth Day of December, 2022

*Katherine Kelly Vidal*
Katherine Kelly Vidal
*Director of the United States Patent and Trademark Office*